Feb. 19, 1924.  
O. DORMANN  
1,484,254
PRODUCTION OF CEMENT AND THE LIKE
Filed May 25, 1922
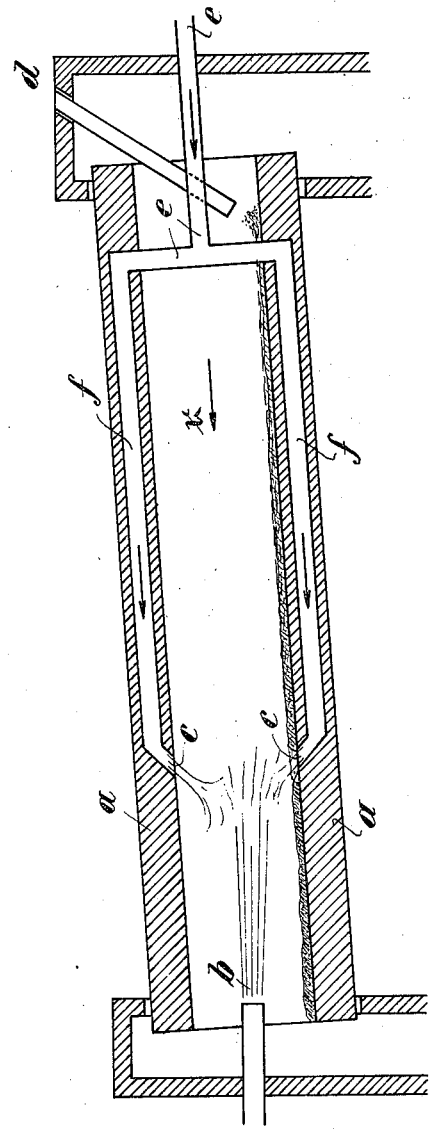
Inventor  
Dr. Otto Dormann  
by *[signature]*  
Attorney.

Patented Feb. 19, 1924.

1,484,254

UNITED STATES PATENT OFFICE.

OTTO DORMANN, OF STETTIN, GERMANY.

PRODUCTION OF CEMENT AND THE LIKE.

Application filed May 25, 1922. Serial No. 563,503.

*To all whom it may concern:*

Be it known that I, OTTO DORMANN, a citizen of Germany, residing at Stettin, Germany, have invented certain new and useful Improvements in the Production of Cement and the like (for which I have filed an application in Germany, July 2, 1920, and Germany, March 30, 1921), of which the following is a specification.

My invention relates to the production of cement and the like, more particularly Portland cement. It is one of the main objects of the present invention to render manufacture of cement more efficient and more economical.

More recent investigations have established the fact that the sintering reaction occurring in the production of Portland cement is an exothermic reaction, accompanied by an evolution of heat. In consequence thereof no supply of heat from outside is required in the sintering zone of the revolving furnace, it being merely necessary to cover the losses occasioned by heat convection and radiation and, if necessary, to heat the material to the temperature required for starting the reaction and to keep it on this temperature. The real demand for a supply of heat in the revolving furnace begins in a zone which lies in the direction of travelling of the material above or behind the zone of sintering at a point where the endothermic or heat consuming reaction for expelling the carbonic acid and the hydrate water takes place. In and before this zone, that is directly above the sintering zone the highest temperature must be obtained; for the higher the difference of temperature between the fire gases and the material to be calcined, the higher the degree of efficiency.

In the usual type of revolving furnace the flame of coal-dust, gas or the like produced under pressure is taken up by the draft of the furnace and with the high velocity of the gases only a comparatively slow combustion is obtained, a long flame being formed. In this case the difference between the temperatures of the fire gases and the material, and in consequence thereof the efficiency are only low. In order, therefore, to attain a result, large quantities of fuel must be used, which naturally act towards a further increase of velocity of the gases and ultimately lead to high losses of heat in the waste gases.

It is therefore necessary to provide a means for carrying through a thorough combustion of the fuel immediately before the sintering zone, that is in the so-called zone of calcination of the revolving furnace. To effect this in the sintering zone itself appears to be useless and in view of the singular behaviour of Portland cement in the sintering zone itself does not even seem practicable.

It has therefore been proposed to dam-up the burning gases by introducing steam jets. Obviously this mode of proceeding had no chance of a success, considering the fact that the steam would sooner act towards lowering, than towards increasing the velocity of combustion. Moreover the quantity of the burning gas would be increased in a highly uneconomical manner by the steam charged with high specific heat and the velocity of the gases further increased whereby the advantages resulting from such damming-up are fully balanced.

In reality the highest velocity of combustion is obtained solely by the perfect mixture of fuel and air before and during combustion. In the revolving furnace for the production of Portland cement the point where the highest velocity of combustion must be obtained, lies before the sintering zone, that is, in the zone of calcination.

It has been tried to improve combustion by introducing further air through the furnace wall by way of a number of openings. However, such introduction of air does not suffice as such for raising the velocity of combustion so high that instead of the long combustion so high that instead of the long flame hitherto produced in the revolving furnace a short hot flame would be obtained, inasmuch as the freshly introduced air travelling in the direction of the fuel gases cannot act towards effecting an intimate mixture of fuel and air.

This can only be effected according to the present invention by forcing this secondary air into the furnace under high pressure and more or less at an acute angle in a direction opposed to that of the gases. Only by proceeding in this manner the formation of strong eddies will be obtained which secure an intimate mixture of fuel and air and the highest combustion velocity obtainable. At the same time the gases are dammed-up in such way that they will not pass across the material at a higher speed than is consistent with the transmission of heat onto the material.

It is a particular object of the present invention to attain this result in the most perfect manner. To this end I cause a current of air to be forced before the sintering zone, where this can be carried out practically, through a circle of apertures in the furnace wall counter to the gas current in such manner that the air jets form a veil filling the entire section of the furnace.

The current of air can be conducted to the desired place in a well known manner by way of longitudinal channels extending in the furnace wall. This arrangement involves the advantage that the air is preheated in the channels by taking up part of the heat of the gases of combustion whereby the obtention of the desired high temperature at the required place is facilitated. This method can be further improved by admixing to the material to be calcined a certain quantity of fuel such as small coke or the like. In the places where this mixture covers the air nozzles through which the secondary air enters the furnace, the air is forced through it and causes a combustion of the fuel with particularly high efficiency.

In the drawings affixed to this specification and forming part thereof a revolving furnace adapted for use in carrying out my invention is illustrated by way of example in diagrammatic section.

In the drawing $a$ is the furnace and $b$ is the current of air serving in a well known manner to introduce the fuel into the furnace. The secondary air of combustion enters the furnace through apertures $c$, its direction of flow being opposed to that of the current $b$, whereby a veil is formed which fills the entire section of the furnace and acts as above described. In the example illustrated the material to be converted into cement is introduced into the furnace through the tube $d$ and travels through the furnace in a direction counter to that of the fuel current. The secondary air of combustion is supplied by way of the tube $e$ and in passing through channels $f$ provided in the furnace wall is preheated before entering the furnace by the aperture $c$.

I wish it to be understood that I do not desire to be limited to the exact details of procedure hereinbefore described nor to the special means disclosed in the specification and in the drawings appertaining thereto, for obvious modifications will occur to a person skilled in the art.

I claim:

1. The method of producing cement, and more particularly Portland cement, consisting in heating the raw material in a revolving furnace and damming-up or choking the heating gas current in the zone of calcination by a veil of air substantially extending transversely across the furnace.

2. The method of producing cement, and more particularly Portland cement, consisting in heating the raw material in a revolving furnace and forcing part of the air required for combustion into the calcinating zone of the furnace in such manner as to dam-up or choke the heating gas current.

3. The method of producing cement, and more particularly Portland cement, consisting in heating the raw material in a revolving furnace and forcing part of the air required for combustion into the calcinating zone of the furnace in such manner as to form a veil of air substantially extending transversely across the furnace.

4. The method of producing cement, and more particularly Portland cement, consisting in heating the raw material in a revolving furnace and forcing part of the air required for combustion into the calcinating zone of the furnace in substantially radial jets travelling in a direction counter to that of the burning gases.

In testimony whereof I affix my signature.

OTTO DORMANN.

Witnesses:
E. HOLTZERMAN,
R. T. ALLTPACE.